Feb. 7, 1950 M. F. BERGLUND 2,496,430
HYDROSCOPE AND CAMERA COMBINATION
Filed May 27, 1947 2 Sheets-Sheet 1
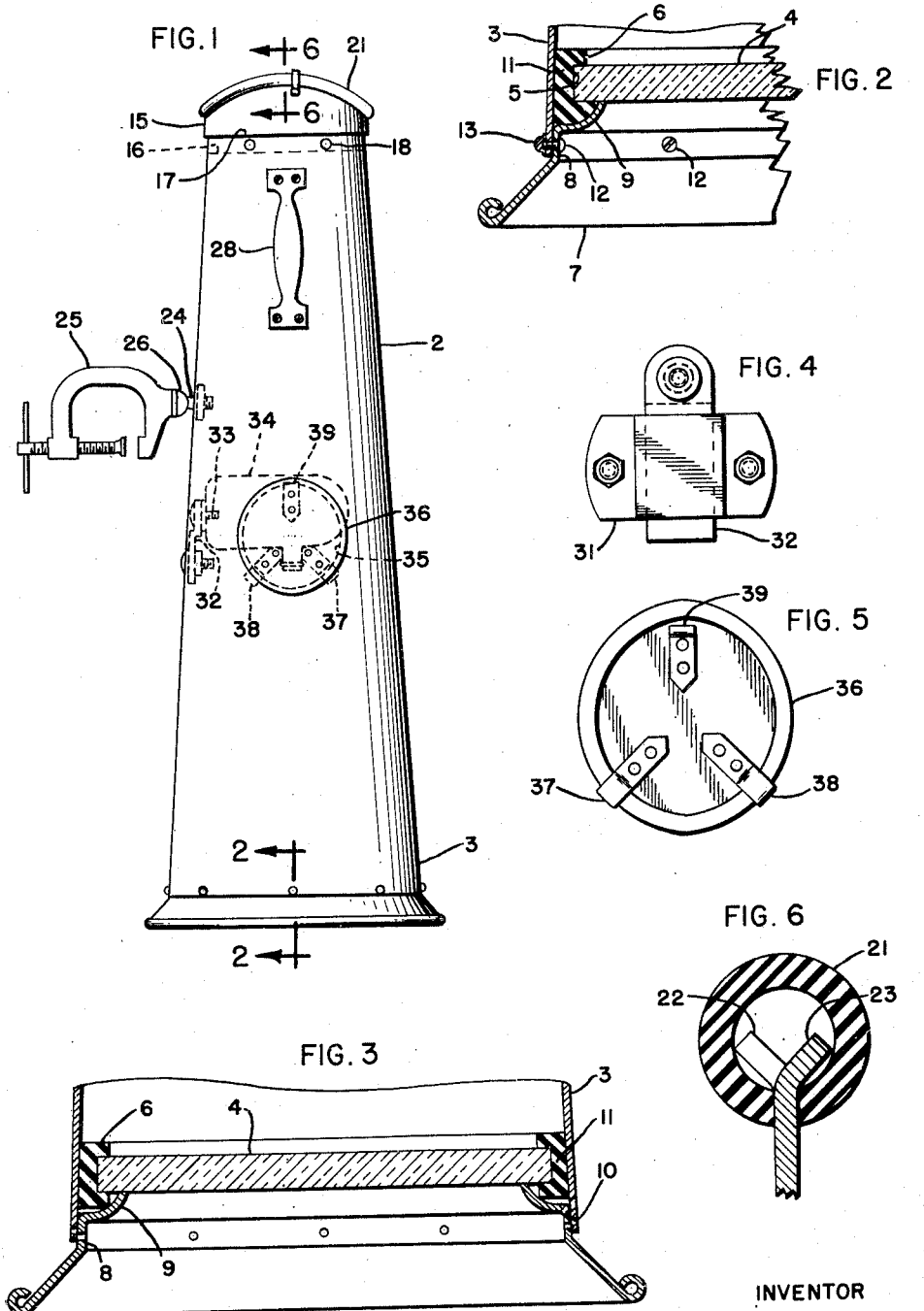
INVENTOR
MALCOLM F. BERGLUND
BY
Joshua R. H. Potts
HIS ATTORNEY Feb. 7, 1950 M. F. BERGLUND 2,496,430
HYDROSCOPE AND CAMERA COMBINATION
Filed May 27, 1947 2 Sheets-Sheet 2

INVENTOR
MALCOLM F. BERGLUND
BY
*Joshua H. Potts*
HIS ATTORNEY

Patented Feb. 7, 1950

2,496,430

UNITED STATES PATENT OFFICE 2,496,430

HYDROSCOPE AND CAMERA COMBINATION

Malcolm F. Berglund, Chicago, Ill.

Application May 27, 1947, Serial No. 750,715

4 Claims. (Cl. 95—11)

The present invention relates to hydroscopes.

It is an object of the present invention to provide a hydroscope which is of simple construction and is inexpensive to manufacture.

A further object is the provision of a hydroscope having an arrangement for securing a camera therein for taking under water pictures.

Another object is the provision of a hydroscope employing a novel lens holding construction and in which the lens is readily removable.

Still another object is the provision of a hydroscope capable of attachment to a boat or the like and which can be aimed in any direction when so attached.

Further objects and advantages will appear and be brought out more fully in the following specification, reference being had to the accompanying drawings, in which:

Figure 1 is an elevation showing my invention,

Figure 2 is a fragmentary sectional view taken on line 2—2 of Figure 1,

Figure 3 is a view similar to Figure 2 showing parts before they are fully assembled, Figure 4 is an elevation of a detail, Figure 5 is a rear view of the handhole cover, Figure 6 is a section of a detail.

Figure 7:
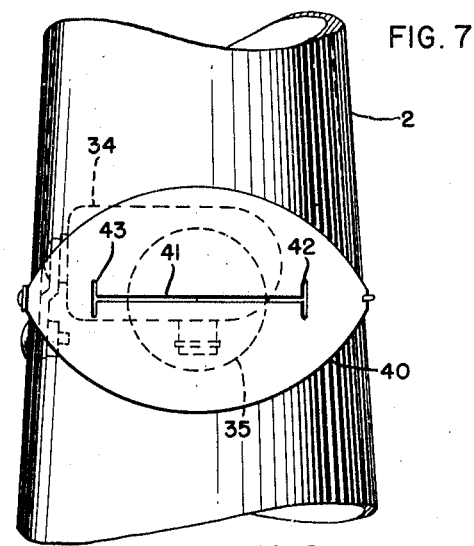
Figure 7 is a fragmentary side elevation showing a special closing boot for the handhole.
Figure 8:
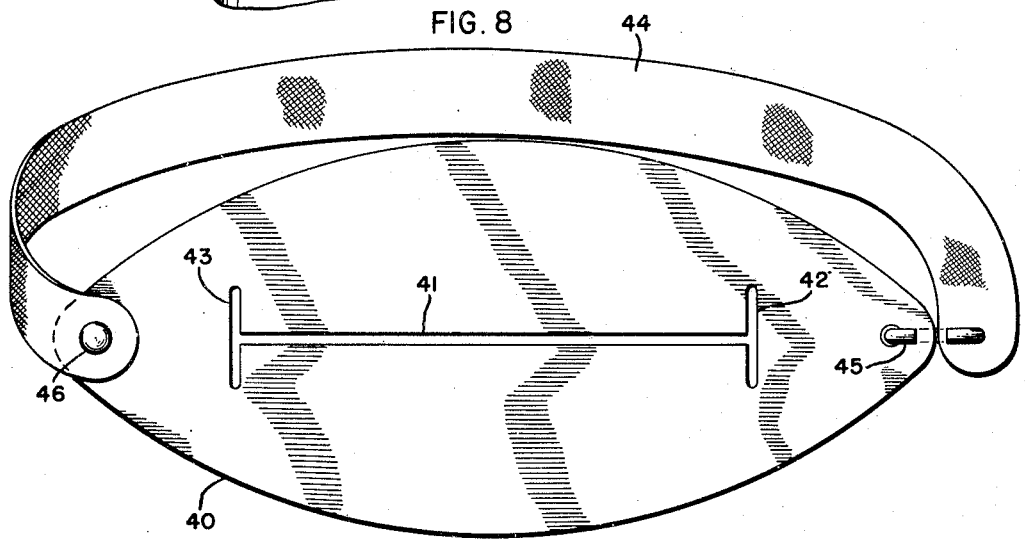
Figure 8 is an enlarged perspective view of the boot.

Referring to the drawing, Figure 1, the hydroscope comprises a casing 2 of suitable material, such as sheet metal rolled into a frusto-conical shape, and may be painted black on the interior. Adjacent the bottom end 3 there is provided a lens 4, which may be of polished plate glass or other suitable material, the periphery of which is received within a groove 5 of a gasket 6 of live rubber or other suitable resilient material. However, the gasket 6 need not have a preformed groove therein, for by encircling the edge of the lens with a stretched flat rubber band the edges thereof will curl over the glass to provide a groove like construction. A bell shaped piece 7 has a shank adapted to be received within the large end of the casing and a bezel ring portion 9 is preferably integral therewith, and as shown bears against the gasket 6 and the glass. The bell and bezel may be formed by spinning, or by any other suitable manufacturing method. A hole 10 or series of such holes are provided in the bell to allow escape of air from beneath the lens.

In assembling the lens end as shown in Figure 3, the gasket 6 is first placed around the periphery of the lens 4, and the lens then inserted in the large end 3 of the casing with the gasket engaging the sides thereof. The shank portion 8 of the bell is then inserted and the bezel ring 9 engages the gasket and forces it toward the smaller end of the casing until the gasket portion 11 between the wall and glass can be no further compressed or distorted, whereupon the glass is held in leak proof relation. The bezel 9 also compresses the extruding part of the gasket into the quarter round recess provided therein as shown in Figure 2. The screws 12 then are inserted from the interior through aligned holes in the casing and shank, and may receive cap nuts 13 thereon.

In case of breakage of the lens, its replacement is simple. The bell end is removed and the broken lens taken out, a new lens is inserted in the gasket and the new lens is then introduced into the end of the casing and fastened as above described.

The eye piece 15 comprises a cylindrical portion having a reduced shank 16 which fits into the smaller end 17 and is held thereon by suitable screws passing through aligned holes in the casing and eyepiece, and which receive cap nuts 18 thereon. The end of the eyepiece is suitably contoured to conform to the face of the user, and carries a cushion pad 21 of rubber or other suitable material, the ends being secured by a suitable clamp. The pad 21 preferably is in the form of a split rubber hose and is held on the edge of the eyepiece by serrating the edge and oppositely setting the serrations as shown at 22, 23 in Figure 6. A bolt 24 having a ball thereon is fastened to the wall of the casing and a C-clamp 25 with a ball socket 26 is secured to said ball. The hydroscope may be attached to the stern or gunwale of a boat by means of the C-clamp and is thus held for universal movement. A pair of handles 28 (one only being shown) may be provided to facilitate carrying or manipulation of the hydroscope.

Within the casing there is suitably secured a U-strap 31. An angular bracket 32 carries a bolt 33 at its upper end. The bolt 33 threads in the base of a motion picture camera 34, and the shank end of the bracket is received in the U-strap 31 to hold the camera in position within the casing. The camera and bracket may be inserted in position through the hand hole 35 which is normally closed by a cover 36 having tongues 37, 38 at the bottom which fit over the beaded edge of the handhole. A short tongue 39 can be forced over the beaded edge to hold the cover in position.

If desired, a boot indicated generally by the numeral 40 may be provided to fit over the hand hole 35. Boot 40 comprises a plate of pliable material such as sheet rubber or the like having a slit 41 therein terminating in end slits 42 and 43; one end of a strap 44 is linked thereto by a suitable link 45 passing through holes in the plate and strap, and the other end of the strap is secured thereto by a snap fastener 46. The strap 44 is of such length that when the boot girds the casing 2, the plate is held in position with the slit 41 across the hand hole 35. This structure enables the operator's hand to be inserted through slit 41 to operate the camera, without admitting too much light.

In use, the hydroscope may be carried in the hands, or may be fastened to the gunwale or stern of a boat, and can be manipulated or aimed by hand while thus secured, because of the universal joint on the C-clamp. When hydroscope is employed for visual observation, the hand hole 25 is covered by the cover 36. When it is desired to take underwater pictures, the camera and bracket are inserted through the hand hole 35 and the camera can be sighted by the observer who holds his face at the eyepiece end and manipulates or airs the hydroscope. In this location the angle of sight of the camera is always wider then the angle of sight of the observer. The camera can be operated or wound by the operator through the hand hole, as the obstruction of the opening by the operator's hand excludes enough light to assure satisfactory operation of the camera. In cases where more protection from light is required, the boot 40 may be applied and the hand of the operator extended through the slit therein for operating the camera.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. A hydroscope comprising a casing, a lens at the lower end thereof, an eyepiece at the upper end of said casing, a handhole intermediate the ends thereof, a camera means for removably securing said camera in said casing adjacent said handhole, and a slitted boot secured in position over said handhole.

2. A hydroscope comprising a conical casing, a lens at the lower end thereof, an eyepiece at the upper end of said casing, a handhole intermediate the ends thereof, a camera, means for removably securing said camera in said casing adjacent said handhole, and a slitted boot having a girdling strap located over said hand hole.

3. A hydroscope comprising a casing having a handhole therein, a lens at the lower end of said casing, an eyepiece at the upper end of said casing, a U-strap secured to the interior wall of the casing adjacent to said handhole, an angle bracket carrying a camera carried by said U-strap, and a boot having a slit therein connecting transverse slits at the end thereof, said boot having a strap secured thereto and girding said casing in the zone of said handhole whereby said boot covers said handhole.

4. A hydroscope comprising an elongated frusto-conical casing having an eye piece at one end and a viewing opening at the other; a movie camera; means intermediate the ends of said casing for supporting said camera, said means and camera being visible through said eye piece, and said casing having an intermediate opening through which said camera may be operated; and a slitted boot covering said opening to exclude light from said camera.

MALCOLM F. BERGLUND.

REFERENCES CITED

The following references are of record in the file of this patent:

UNITED STATES PATENTS

| Number | Name | Date |
|---|---|---|
| 572,803 | Hubbard | Dec. 8, 1896 |
| 1,149,678 | Parker | Aug. 10, 1915 |
| 1,236,265 | Casson | Aug. 7, 1917 |
| 1,258,810 | Pulliam | Mar. 12, 1918 |
| 1,451,096 | Hagen | Apr. 10, 1923 |
| 1,810,302 | Stiles | June 16, 1931 |
| 2,001,682 | Jackman | May 14, 1935 |
| 2,256,133 | Barnes | Sept. 16, 1941 |
| 2,343,473 | Pierson | Mar. 7, 1944 |
| 2,358,231 | Johnson | Sept. 12, 1944 |
| 2,373,815 | Del Riccio | Apr. 17, 1945 |
| 2,404,556 | Wirth | July 23, 1946 |
| 2,420,719 | Parks | May 20, 1947 |

FOREIGN PATENTS

| Number | Country | Date |
|---|---|---|
| 744,934 | France | Jan. 31, 1933 |
| 832,164 | France | June 27, 1938 |